(12) United States Patent
Chen

(10) Patent No.: US 8,931,894 B1
(45) Date of Patent: Jan. 13, 2015

(54) GLASSES AND NOSE PAD ASSEMBLY THEREOF

(71) Applicant: Lin Yun Chen, Tainan (TW)

(72) Inventor: Lin Yun Chen, Tainan (TW)

( * ) Notice: Subject to any disclaimer, the term of this patent is extended or adjusted under 35 U.S.C. 154(b) by 5 days.

(21) Appl. No.: 13/938,322

(22) Filed: Jul. 10, 2013

(51) Int. Cl.
  *G02C 1/04* (2006.01)
  *G02C 5/12* (2006.01)

(52) U.S. Cl.
  CPC .......................................... *G02C 5/12* (2013.01)
  USPC ............ 351/106; 351/103; 351/137; 351/138

(58) Field of Classification Search
  CPC ...... G02C 1/02; G02C 1/023; G02C 2200/18; G02C 1/04; G02C 1/06; G02C 5/12
  USPC ........... 351/106, 103, 137, 138, 128, 124, 86, 351/83
  See application file for complete search history.

(56) References Cited

U.S. PATENT DOCUMENTS

| | | | | |
|---|---|---|---|---|
| 4,951,322 A * | 8/1990 | Lin | ................................... | 2/439 |
| 5,159,359 A * | 10/1992 | Pauly et al. | .................... | 351/128 |
| 6,554,422 B2 * | 4/2003 | Bell | .............................. | 351/128 |
| 7,591,555 B1 * | 9/2009 | Chen | ............................. | 351/137 |
| 7,594,723 B2 * | 9/2009 | Jannard et al. | ................ | 351/106 |

* cited by examiner

*Primary Examiner* — Hung Dang
(74) *Attorney, Agent, or Firm* — Rosenberg, Klein & Lee

(57) ABSTRACT

A nose pad assembly includes a top rod having a recessed section in an inner side thereof. A chamber is defined in a bottom wall of the recessed section. A rib and a fixing groove are provided on a bottom face of the chamber. A nose pad includes a connection rod received in the chamber and having a guiding hole and a ridge. A closure plate is mounted in the recessed section and includes a block extended through the guiding hole and engaged in the fixing groove. The ridge is forcibly passable through the rib and movable between an upper position at an upper side of the rib and a lower position at a lower side of the rib. The nose pad assembly can be assembled with a lens unit to form glasses, with the lens unit held by the nose pad and the top rod.

9 Claims, 9 Drawing Sheets

GLASSES AND NOSE PAD ASSEMBLY THEREOF

BACKGROUND OF THE INVENTION

The present invention relates to glasses with a nose pad assembly and, more particularly, to glasses including a nose pad assembly having an adjustable nose pad.

Glasses can correct eyesight or shield eyes of users from sunlight, wind, and sand. Glasses generally include a frame, at least one lens, and two temples pivotably connected to two ends of the frame, respectively. The lens is forcibly inserted into a groove of the frame while using the elasticity of the frame to prevent the lens from falling from the groove. However, the lens unit could break due to its fragility during assembly and detachment.

U.S. Pat. No. 7,591,555 discloses a framework of combination of spectacle frames with lenses. The framework includes a spectacle frame including an upper arm and joining together with a nosepiece. A hole seat is formed between a hemline of the upper arm and the nosepiece. A wedge hole is formed inside the hole seat. At least one section is formed inside the wedge hole, and a first wide portion, a first narrow portion, and a second wide portion are formed from top to bottom in sequence. A gibbous wedge is connected to the top end of nosepiece. A width of the gibbous wedge is smaller than the first wide portion of the wedge hole and is larger than the second wide portion and is slightly larger than the first narrow portion of the wedge hole to make the gibbous wedge to be brought into the first wide portion and then constrain the first narrow portion and, thus, locate in the second wide portion. A distance between the nosepiece and the upper arm is, thus, adjustable.

However, the gibbous wedge is apt to wear after repeated upward and downward movement in the wedge hole. As a result, the gibbous wedge can not be retained in place. Furthermore, the whole nosepiece could fall from the spectacle frame if the diameter of the worn gibbous wedge is smaller than the wedge hole. Further, since the wedge hole is in communication with the outside, paint is apt to enter the wedge hole during a painting procedure of the spectacle frame and could adversely affect operation of the gibbous wedge or even completely hinder movement of the gibbous wedge, requiring additional attention in manufacturing and leading to an increase in the manufacturing costs.

Thus, a need exists for novel glasses that mitigate and/or obviate the above disadvantages.

BRIEF SUMMARY OF THE INVENTION

In a first aspect of the present invention, a nose pad assembly for glasses includes a top rod having an inner side and an outer side opposite to the inner side and spaced from the inner side in a thickness direction. The inner side is adapted to face a face of a wearer. A recessed section is formed in a central portion of the inner side. The recessed section includes a bottom wall located between the inner side and the outer side in the thickness direction. A chamber is defined in the bottom wall of the recessed section. The chamber includes a bottom face located between the bottom wall of the recessed section and the outer side in the thickness direction. A first rib is formed on the bottom face of the chamber. A fixing groove is formed in the bottom face of the chamber and located below the first rib in a vertical direction perpendicular to the thickness direction. A nose pad includes a connection rod extending from a top end of the nose pad. The connection rod is received in the chamber. The connection rod includes a guiding hole. A ridge projects from an upper end of the connection rod. A closure plate is mounted in the recessed section. The closure plate includes a block extended through the guiding hole of the connection rod and engaged in the fixing groove. The ridge is forcibly passable through the first rib and movable in the vertical direction between an upper position at an upper side of the first rib and a lower position at a lower side of the first rib.

In an example, a second rib is formed on the bottom face of the chamber and located between the first rib and the fixing groove. The ridge in the lower position is located between the first rib and the second rib. The ridge can be forcibly passed through the second rib in the vertical direction to a position located at a lower side of the second rib and rested on the block.

In a second aspect, the present invention provides glasses including the nose pad assembly and a lens unit. The lens unit is held by the nose pad and the top rod.

The lens unit of the glasses according to the present invention does not have to be assembled between the nose pad and the top rod through forcible insertion. Furthermore, by providing the block of the closure plate extended through the guiding hole and fixed in the fixing groove, the nose pad will not disengage from the recessed portion even if the ridge of the connecting rod and the first and second ribs are worn out. Further, the closure plate avoids accumulation of paint in the recessed portion and on the surface of the connecting rod during a painting procedure. Thus, adjustment of the relative positional relation between the nose pad and the top rod is not adversely affected.

The present invention will become clearer in light of the following detailed description of illustrative embodiments of this invention described in connection with the drawings.

DESCRIPTION OF THE DRAWINGS

FIG. 1A is an enlarged view of an upper circled portion in FIG. 1.

FIG. 1B is an enlarged view of a lower circled portion in FIG. 1.

DETAILED DESCRIPTION OF THE INVENTION

Figure 1:
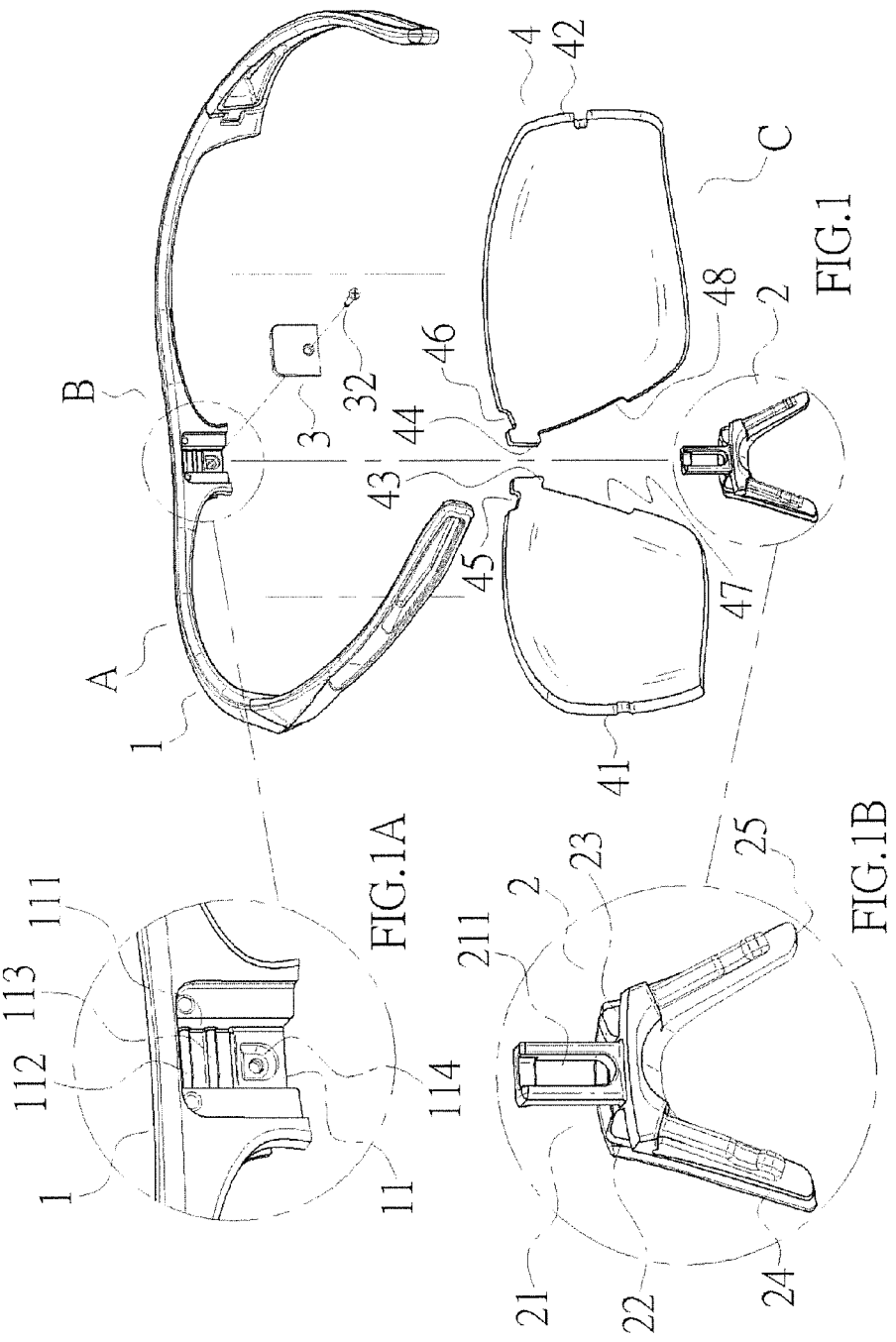
FIG. 1 is an exploded, perspective view of glasses of a first embodiment according to the present invention.

With reference to FIGS. 1-4, a nose pad assembly B for glasses according to the present invention includes a top rod 1 having an inner side and an outer side opposite to the inner side and spaced from the inner side in a thickness direction. The inner side is adapted to face a face of a wearer. A recessed section 11 is formed in a central portion of the inner side. The recessed section 11 includes a bottom wall located between the inner side and the outer side in the thickness direction. A chamber 111 is defined in the bottom wall of the recessed section 11 and includes a bottom face located between the bottom wall of the recessed section 11 and the outer side in the thickness direction. A first rib 112 is formed on the bottom face of the chamber 111. A fixing groove 114 is formed in the bottom face of the chamber 111 and located below the first rib 112 in a vertical direction perpendicular to the thickness direction.

The nose pad assembly B further includes a nose pad 2 having a connection rod 21 extending from a top end of the nose pad 2. The connecting rod 21 is received in the chamber 111. The connection rod 21 includes a guiding hole 211. A ridge 212 projects from an upper end of the connection rod 21.

The nose pad assembly B further includes a closure plate 3 mounted in the recessed section 11 to close the chamber 111. The closure plate 3 includes a block 31 extended through the guiding hole 211 of the connection rod 21 and engaged in the fixing groove 114. The block 3 is fixed in the fixing groove 114 by a fastener 32 preferably made of metal to provide a secure engagement effect.

Figure 3:
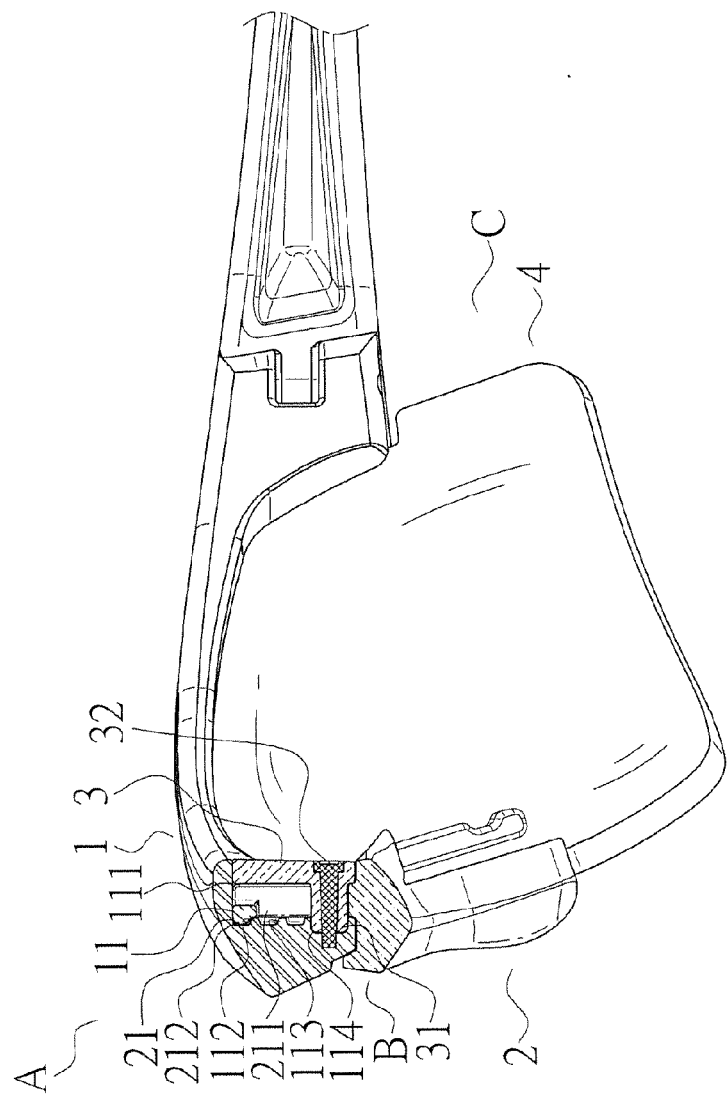
FIG. 3 is a cross sectional view taken along section line 3-3 of FIG. 2.
Figure 4:
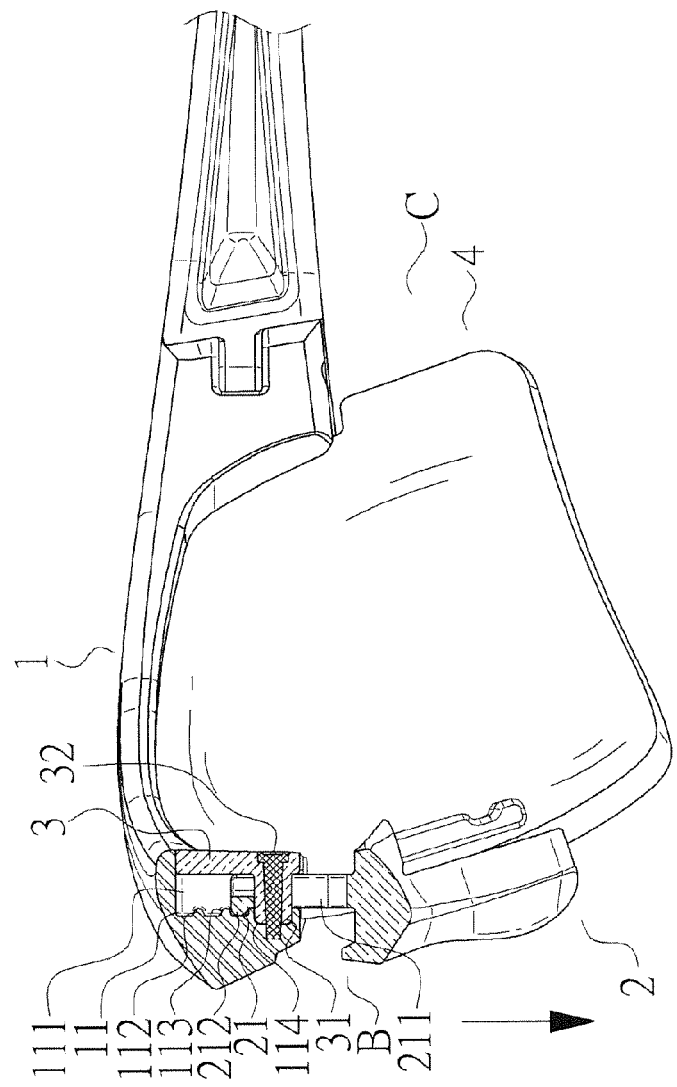
FIG. 4 is a view similar to FIG. 3, illustrating adjustment of a position of a nose pad.

With reference to FIGS. 3 and 4, the ridge 212 is forcibly passable through the first rib 112 and movable in the vertical direction between an upper position at an upper side of the first rib 112 and a lower position at a lower side of the first rib 112. In this embodiment, a second rib 113 is formed on the bottom face of the chamber 111 and located between the first rib 112 and the fixing groove 114. The ridge 212 in the lower position is located between the first rib 112 and the second rib 113. The ridge 212 can be forcibly passed through the second rib 113 in the vertical direction to a position located at a lower side of the second rib 113 and rested on the block 31. A multistage adjustment is provided for the nose pad 2 in the adjustment of the relative position between the nose pad 2 and the top rod 1 in the vertical direction.

Figure 2:
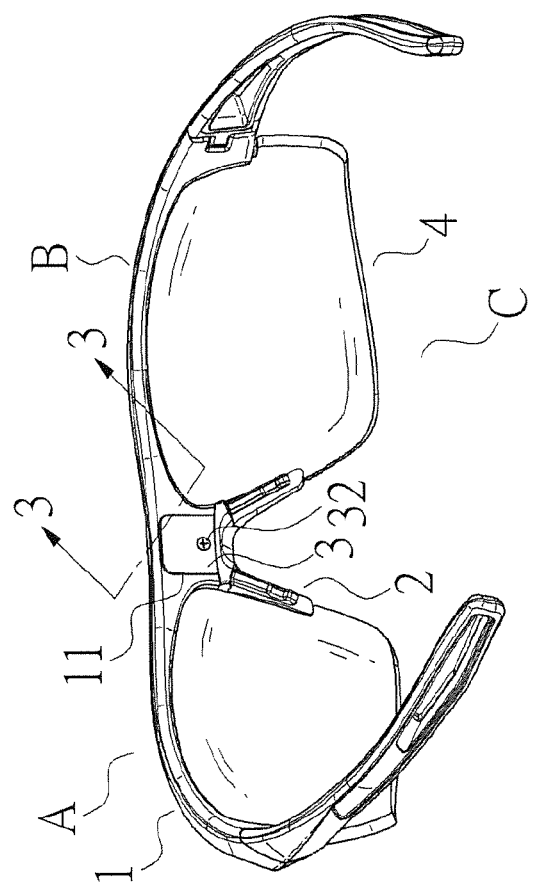
FIG. 2 is a perspective view of the glasses of FIG. 1.
Figure 7:
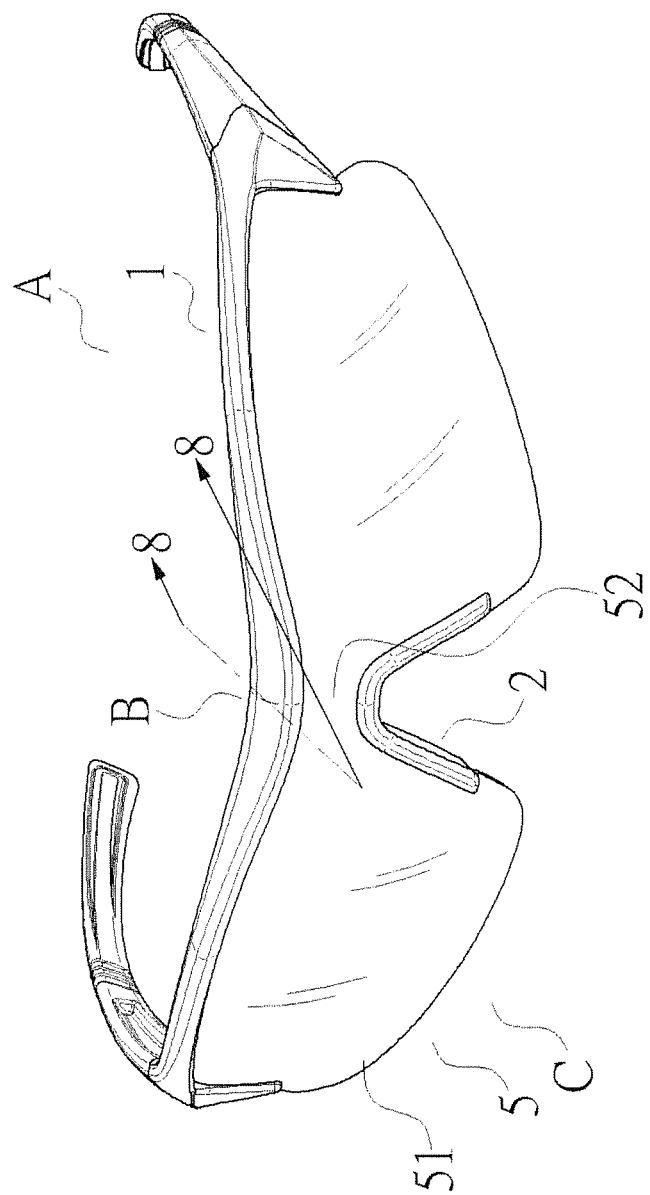
FIG. 7 is a perspective view of glasses of a second embodiment according to the present invention.

With reference to FIGS. 2 and 7, the present invention further provides a pair of glasses A including the nose pad assembly B and a lens unit C. The lens unit C is held by the nose pad 2 and the top rod 1.

Figure 5:
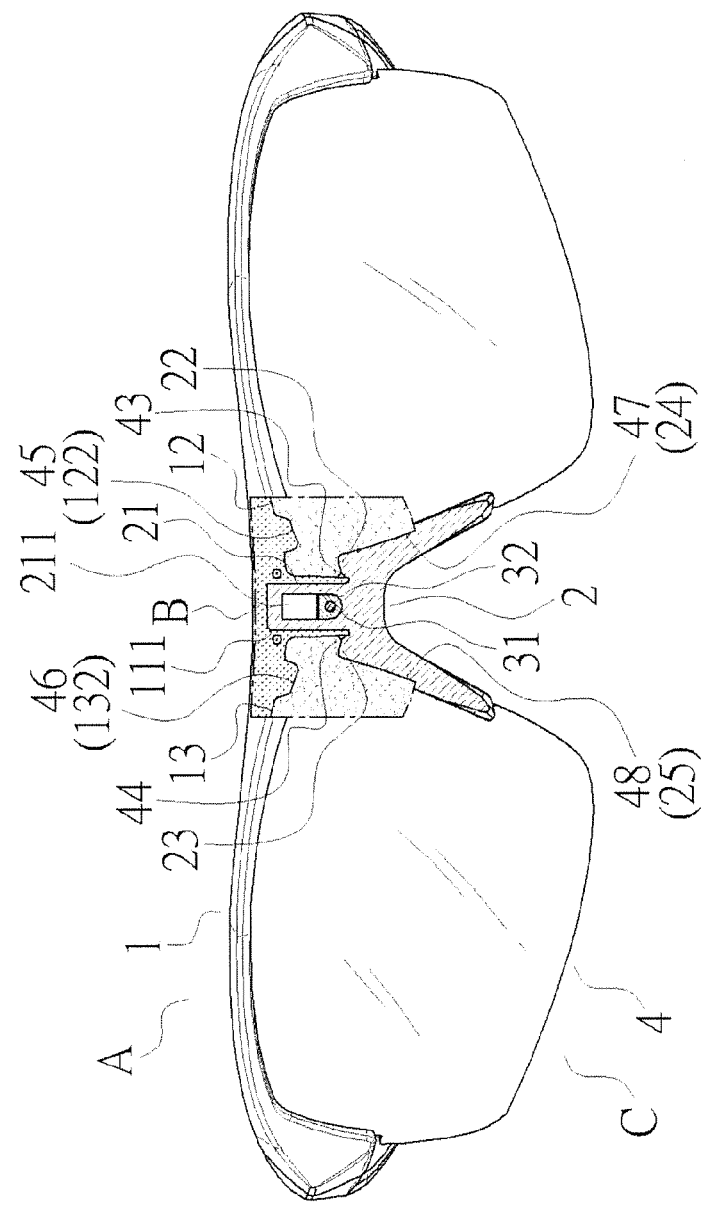
FIG. 5 is a front view of the glasses of FIG. 1, with a portion of the glasses cross sectioned.
Figure 6:
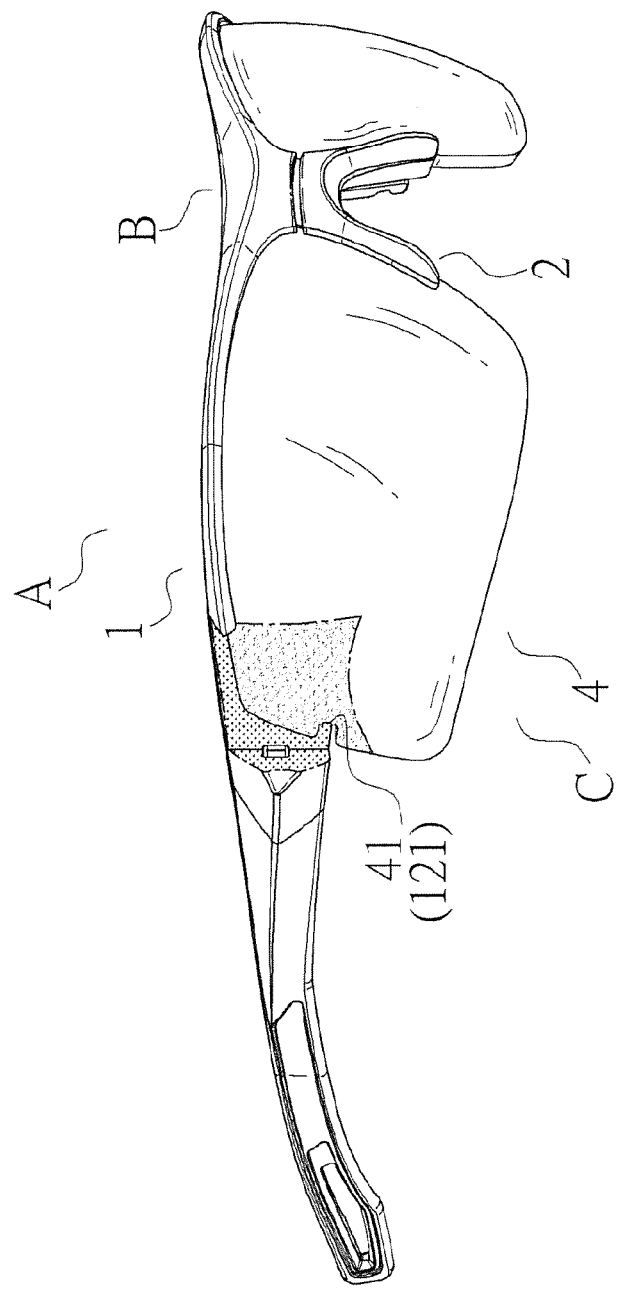
FIG. 6 is another perspective view of the glasses of FIG. 1, with a portion of the glasses sectioned.

With reference to FIGS. 1, 5, and 6, the top rod 1 includes a left section and a right section. The left section includes a bottom edge having a first groove 12 with a downwardly facing opening. The right section includes a bottom edge having a second groove 13 with a downwardly facing opening. Each of the first and second grooves 12 and 13 includes a distal end away from the nose pad. A first abutment portion 121 is formed on the distal end of the first groove 12. A second abutment portion is formed on the distal end of the second groove 13. The nose pad 2 includes two shoulders respectively having third and fourth abutment portions 22 and 23.

The lens unit C includes first and second lenses 4 respectively received in the first and second grooves 12 and 13. Each of the first and second lenses 4 includes an outer side away from the nose pad 2 and an inner side adjacent to the nose pad 2. The outer side of the first lens 4 has a first protruded portion 41, and the outer side of the second lens 4 has a second protruded portion 42. The first protruded portion 41 abuts the first abutment portion 121, and the second protruded portion 42 abuts the second abutment portion . A third protruded portion 43 is formed on the inner side of the first lens 4, and a fourth protruded portion 44 is formed on the inner side of the second lens 4. The third protruded portion 43 abuts the third abutment portion 22, and the fourth protruded portion 43 abuts the fourth abutment portion 23.

With reference to FIGS. 5 and 6, each of the first and second lenses 4 further includes a top edge extending between the inner and outer sides thereof. The top edge of the first lens 4 includes a first recessed portion 45, and the top edge of the second lens 4 includes a second recessed portion 46. A fifth protruded portion 122 is formed in the first groove 12, and a sixth protruded portion 131 is formed in the second groove 13. The first recessed portion 45 is engaged with the fifth protruded portion 122, and the second recessed portion 46 engaged with the sixth protruded portion 131.

The nose pad 2 further includes third and four grooves 24 and 25 respectively in two lateral sides thereof. The first lens 4 further includes a third recessed portion 47 engaged with the third groove 24. The second lens 4 further includes a fourth recessed portion 48 engaged with the fourth groove 25.

With reference to FIGS. 1 and 5, the top edge of each of the third and fourth abutment portions 22 and 23 has a recess for engagement with the third and fourth protruded portions 43 and 44 of the first and second lenses 4, providing more reliable assemblage between the nose pad assembly B and the first and second lenses 4.

Figure 8:
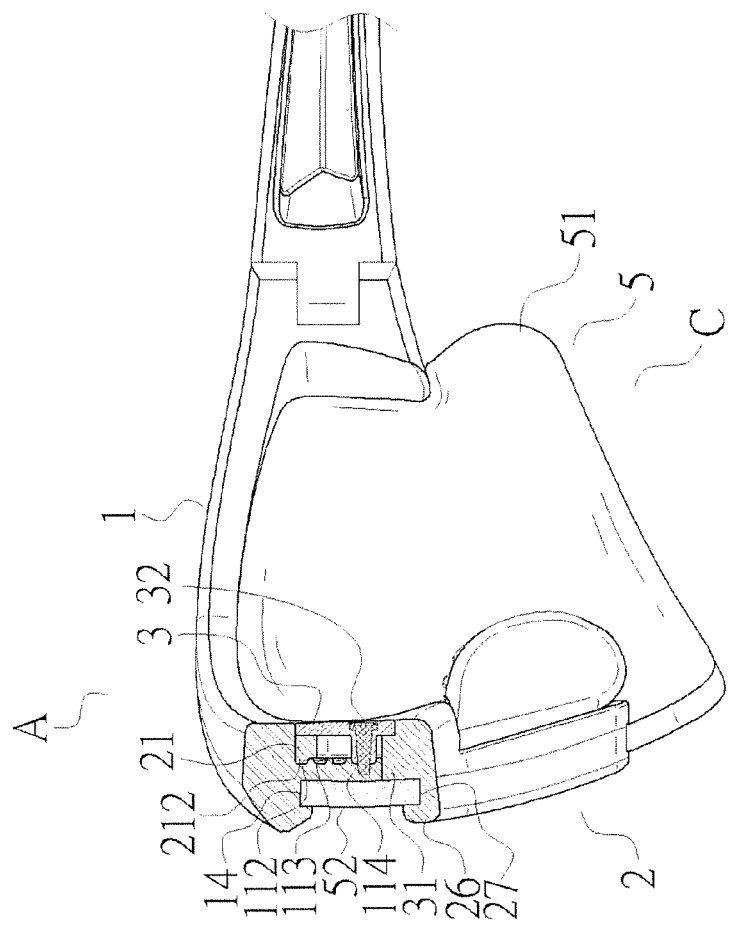
FIG. 8 is a cross sectional view taken along section line 8-8 of FIG. 7.
Figure 9:
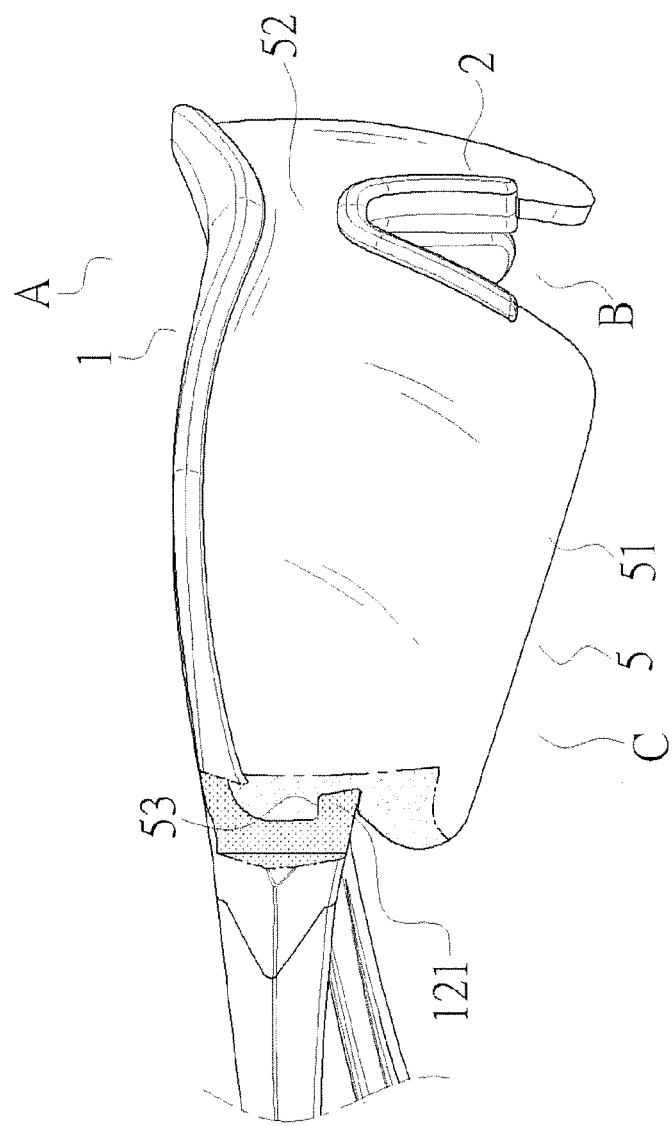
FIG. 9 is another perspective view of the glasses of FIG. 7, with a portion of the glasses sectioned.

In a second embodiment shown in FIGS. 7-9, the top rod 1 includes a bottom edge having a groove 14 adjacent to the outer side. The groove 14 has a downwardly facing opening. The nose pad 2 includes a support 26 having a support groove 27 with an upwardly facing opening. The lens unit C includes a one-piece lens 5 having first and second lens sections 51 joining with each other at a neck 52. The neck 52 is received in the groove 14 and the support groove 27.

The first lens section 51 includes a seventh protruded portion 53 on an outer edge thereof distant to the nose pad 2. The second lens section 51 includes an eighth protruded portion on an outer edge thereof distant to the nose pad 2. The seventh protruded portion 53 abuts the first abutment portion 121, and the eighth protruded portion abuts the second abutment portion, providing more reliable assemblage for the nose pad assembly B and the lens 5.

With reference to FIGS. 4 and 8, the ridge 212 can be forcibly moved across the first and second ribs 112 and 113 to adjust the relative position between the nose pad 2 and the top rod 1 in the vertical direction. The position of the support 26 and the support groove 27 is changed according to the relative positional relation between the nose pad 2 and the top rod 1 in the vertical direction. Since the lens 5 is supported in the support groove 27, the relative positional relation between the lens 5 and the top rod 11 in the vertical direction can be adjusted, allowing tight coupling of the lens 5 according to needs.

Thus, the lens unit C of the glasses A according to the present invention does not have to be assembled between the nose pad 2 and the top rod 1 through forcible insertion. Furthermore, by providing the block 31 of the closure plate 3 extended through the guiding hole 211 and fixed in the fixing groove 114, the nose pad 2 will not disengage from the recessed portion 111 even if the ridge 212 of the connecting rod 21 and the first and second ribs 112 and 113 are worn out. Further, the closure plate 3 avoids accumulation of paint in the recessed portion 11 and on the surface of the connecting rod 21 during a painting procedure. Thus, adjustment of the relative positional relation between the nose pad 2 and the top rod 1 is not adversely affected.

Although specific embodiments have been illustrated and described, numerous modifications and variations are still possible without departing from the essence of the invention. The scope of the invention is limited by the accompanying claims.

The invention claimed is:

1. A nose pad assembly for glasses, comprising:
   a top rod including an inner side and an outer side opposite to the inner side and spaced from the inner side in a thickness direction, with the inner side adapted to face a face of a wearer, with a recessed section formed in a central portion of the inner side, the recessed section including a bottom wall located between the inner side and the outer side in the thickness direction, with a chamber defined in the bottom wall of the recessed section, with the chamber including a bottom face located between the bottom wall of the recessed section and the outer side in the thickness direction, with a first rib formed on the bottom face of the chamber, with a fixing groove formed in the bottom face of the chamber and located below the first rib in a vertical direction perpendicular to the thickness direction;

a nose pad including a connection rod extending from a top end of the nose pad, with the connecting rod received in the chamber, with the connection rod including a guiding hole, with a ridge projecting from an upper end of the connection rod; and a closure plate mounted in the recessed section, with the closure plate including a block extended through the guiding hole of the connection rod and engaged in the fixing groove, with the ridge forcibly passable through the first rib and movable in the vertical direction between an upper position at an upper side of the first rib and a lower position at a lower side of the first rib.

2. The nose pad assembly as claimed in claim 1, further comprising: a second rib formed on the bottom face of the chamber and located between the first rib and the fixing groove, with the ridge in the lower position located between the first rib and the second rib, with the ridge forcibly passable through the second rib in the vertical direction to a position located at a lower side of the second rib and rested on the block.

3. The nose pad assembly as claimed in claim 1, with the block fixed in the fixing groove by a fastener.

4. The nose pad assembly as claimed in claim 3, with the fastener made of metal.

5. Glasses comprising the nose pad assembly as claimed in claim 1 and a lens unit, with the lens unit held by the nose pad and the top rod.

6. Glasses as claimed in claim 5, with the top rod including a left section and a right section, with the left section including a bottom edge having a first groove with a downwardly facing opening, with the right section including a bottom edge having a second groove with a downwardly facing opening, with each of the first and second grooves including a distal end away from the nose pad, with a first abutment portion formed on the distal end of the first groove, with a second abutment portion formed on the distal end of the second groove, with the nose pad including two shoulders respectively having third and fourth abutment portions, with the lens unit including first and second lenses respectively received in the first and second grooves, with each of the first and second lenses including an outer side away from the nose pad and an inner side adjacent to the nose pad, with the outer side of the first lens having a first protruded portion, with the outer side of the second lens having a second protruded portion, with the first protruded portion abutting the first abutment portion, with the second protruded portion abutting the second abutment portion, with a third protruded portion formed on the inner side of the first lens, with a fourth protruded portion formed on the inner side of the second lens, with the third protruded portion abutting the third abutment portion, with the fourth protruded portion abutting the fourth abutment portion.

7. Glasses as claimed in claim 6, with each of the first and second lenses further including a top edge extending between the inner and outer sides thereof with the top edge of the first lens including a first recessed portion, with the top edge of the second lens including a second recessed portion, with a fifth protruded portion formed in the first groove, with a sixth protruded portion formed in the second groove, with the first recessed portion engaged with the fifth protruded portion, with the second recessed portion engaged with the sixth protruded portion.

8. Glasses as claimed in claim 7, with the top edge of each of the third and fourth abutment portions having a recess, with the nose pad further including third and four grooves respectively in two lateral sides thereof, with the first lens further including a third recessed portion engaged with the third groove, with the second lens further including a fourth recessed portion engaged with the fourth groove.

9. Glasses as claimed in claim 5, with the top rod including a bottom edge having a groove adjacent to the outer side, with the groove having a downwardly facing opening, with the nose pad including a support having a support groove with an upwardly facing opening, with the lens unit including a one-piece lens having two lens sections joining with each other at a neck, with the neck received in the groove and the support groove.

\* \* \* \* \*